United States Patent
Einola et al.

(10) Patent No.: US 7,065,340 B1
(45) Date of Patent: *Jun. 20, 2006

(54) ARRANGING AUTHENTICATION AND CIPHERING IN MOBILE COMMUNICATION SYSTEM

(75) Inventors: Heikki Einola, Espoo (FI); Teemu Mäkinen, Järvenpää (FI); Keijo Ekola, Tampere (FI); Kari O Virtanen, Tampere (FI); Kalle Tammi, Tampere (FI); Harri Halminen, Kangasala (FI); Vesa Tervo, Tampere (FI); Matti Vilppula, Pirkkala (FI); Rune Lindholm, Salo (FI); Juha T Timonen, Oulu (FI); Jouni Smolander, Tampere (FI)

(73) Assignee: Nokia Networks Oy, Espoo (FI)

( * ) Notice: Subject to any disclaimer, the term of this patent is extended or adjusted under 35 U.S.C. 154(b) by 555 days.

This patent is subject to a terminal disclaimer.

(21) Appl. No.: 09/762,051

(22) PCT Filed: Jun. 2, 2000

(86) PCT No.: PCT/FI00/00495

§ 371 (c)(1),
(2), (4) Date: Jun. 20, 2001

(87) PCT Pub. No.: WO00/76194

PCT Pub. Date: Dec. 14, 2000

(30) Foreign Application Priority Data

Jun. 4, 1999 (FI) ............................... 991283

(51) Int. Cl.
*H04M 1/66* (2006.01)
*H04M 1/68* (2006.01)
*H04M 3/16* (2006.01)

(52) U.S. Cl. ............... 455/410; 455/411; 455/436; 380/270; 380/273

(58) Field of Classification Search ............... 455/410, 455/436, 437, 438, 439; 380/33, 45, 270, 380/273
See application file for complete search history.

(56) References Cited

U.S. PATENT DOCUMENTS 5,199,069 A * 3/1993 Barrett et al. .............. 380/28

(Continued)

FOREIGN PATENT DOCUMENTS

EP 858 186 8/1998

(Continued)

OTHER PUBLICATIONS

TR S3.03 Vo. 1.2. (1999-03), "3G Security: Security Architecture," pp. 1-33.

(Continued)

*Primary Examiner*—Steve M. D'Agosta
(74) *Attorney, Agent, or Firm*—Pillsbury Winthrop Shaw Pittman LLP

(57) ABSTRACT

A method of arranging data protection in a telecommunication system including a first mobile communication network, a second mobile communication network, and a mobile station supporting both of the mobile communication networks is disclosed. The method includes ciphering traffic between the mobile station and the first mobile communication network using a first cipher key; calculating a second cipher key to be used for ciphering traffic between the mobile station and the second mobile communication network in the first mobile communication network when the mobile station operates in the first mobile communication network; transmitting information necessary for calculating the second cipher key from the first mobile communication network to the mobile station when the mobile station operates in the first mobile communication network; and calculating the second cipher key at the mobile station to be used for ciphering traffic between the mobile station and the second mobile communication network.

18 Claims, 2 Drawing Sheets

U.S. PATENT DOCUMENTS

| | | | |
|---|---|---|---|
| 5,564,077 A * | 10/1996 | Obayashi et al. | 455/553.1 |
| 5,850,444 A * | 12/1998 | Rune | 705/79 |
| 5,909,491 A * | 6/1999 | Luo | 380/270 |
| 5,991,405 A | 11/1999 | Mills | |
| 6,081,601 A * | 6/2000 | Raivisto | 380/270 |
| 6,115,699 A * | 9/2000 | Hardjono | 705/51 |
| 6,145,084 A | 11/2000 | Zuili et al. | 713/201 |
| 6,256,735 B1 * | 7/2001 | Maria | 713/169 |
| 6,308,213 B1 * | 10/2001 | Valencia | 709/229 |
| 6,314,468 B1 * | 11/2001 | Murphy et al. | 709/236 |
| 6,373,946 B1 * | 4/2002 | Johnston | 380/211 |
| 6,424,714 B1 * | 7/2002 | Wasilewski et al. | 380/200 |
| 6,766,453 B1 * | 7/2004 | Nessett et al. | 713/171 |
| 6,857,072 B1 * | 2/2005 | Schuster et al. | 713/160 |
| 6,876,747 B1 * | 4/2005 | Faccin et al. | 380/247 |

FOREIGN PATENT DOCUMENTS

| | | |
|---|---|---|
| EP | 892 519 | 1/1999 |
| EP | 898 397 | 2/1999 |
| FI | WO-9859513 | * 12/1998 |
| WO | WO 99/49616 | 9/1999 |

OTHER PUBLICATIONS

Mouly et al., The GSM System for Mobile Communications., Palaiseau, France, 1992.

* cited by examiner

ARRANGING AUTHENTICATION AND CIPHERING IN MOBILE COMMUNICATION SYSTEM

BACKGROUND OF THE INVENTION

The invention relates to a method and an arrangement for arranging data protection disclosed in the preambles of the independent claims.

In mobile communication systems, at least one part of a transmission path is comprised of a wireless section, whereby data transmission takes place via a radio path. A radio path is a physically open resource, which puts security at risk. Various solutions have been developed in digital mobile communication systems to arrange data protection, including ciphering methods and methods for identifying, i.e. authenticating, a user or a subscriber.

In mobile communications systems, a mobile network typically carries out subscriber authentication in order to make sure that only correct parties have an access right. For example, a mobile station in a digital GSM system comprises a subscriber identity module SIM application comprising means for authenticating the subscriber. The SIM application further uses a personal identity number PIN check, whereby only the person who knows the PIN code can use the SIM application. In authentication, the mobile station transmits to the GSM network identification information, and the SIM and thus also the subscriber are authenticated on the basis of this information. The SIM-comprises mobile-operator-specific information, including an SIM-specific international mobile subscriber identity IMSI of a mobile services subscriber. Typically, the SIM also comprises a temporary mobile subscriber identity TMSI within a location area, which can be used to avoid transferring the IMSI over a radio path.

A mobile switching centre MSC, which typically also comprises a visitor location register VLR, transmits an authentication request to an authentication centre AuC. The authentication centre AuC is typically located as a part of a home location register HLR of the subscriber. Subscriber authentication information and authentication algorithms are stored in the authentication centre. On the basis of the IMSI comprised in the authentication request, the authentication centre AuC selects a subscriber-specific authentication key Ki. In addition, a random-number generator generates a number of random-number parameters RAND, which, together with the key Ki, are used to provide each RAND parameter with a checking parameter SRES by applying authentication algorithm A3. The authentication centre AuC typically transmits these RAND/SRES parameters simultaneously with a calculated cipher key Kc to the visitor location register VLR to be stored.

When the VLR wishes to authenticate a subscriber, it selects a RAND value for the parameter from a RAND/SRES table corresponding to the present subscriber and transmits the RAND value to the mobile station and further to the SIM application. The SIM comprises the same authentication key Ki and authentication algorithm A3 as those used at the authentication centre AuC. The SIM calculates the SRES parameter, which is the authentication response, by means of the received RAND parameter and the key Ki by applying algorithm A3. The mobile station returns the SRES parameter to the visitor location register VLR. The VLR compares the SRES value transmitted by the mobile station with a stored SRES value, and if they are the same, the authentication has succeeded. In principle, the GSM network can request authentication at any stage when a mobile station is registered in the network. Authentication can be carried out particularly when a mobile station registers in a network.

Ciphering is used in many telecommunication systems to prevent data to be transmitted from becoming subject to unauthorised access. For example, it is possible in the GSM system to use ciphering of data transmission which is difficult to crack, whereby speech and data converted into digital form are ciphered at the mobile station to be transmitted over the radio path. Similarly, received ciphered data in the GSM network is deciphered into plain speech and data. In connection with the present application, ciphering can refer either to ciphering or deciphering of traffic. Ciphering and user authentication utilise cipher keys and ciphering algorithms accessible to the particular transmission and reception equipment only.

When in the GSM system the mobile switching centre MSC/VLR has authenticated the user, ciphering of the traffic to be transmitted can be initiated. The cipher key Kc is calculated in connection with authentication by means of the secret key Ki and the random number RAND by applying algorithm A8 both at the authentication centre AuC and the SIM. Algorithms A3 and A8 are typically implemented such that both the SRES parameter and the cipher key Kc are calculated simultaneously. In the authentication parameters the authentication centre transmits the cipher key Kc with the RAND and SRES parameters to the visitor location register VLR, whereby these three parameters form a "triplet". The cipher key Kc is stored in the visitor location register VLR. The visitor location register VLR transmits the random number RAND to the SIM application for authentication and cipher key calculation. The SIM calculates the cipher key Kc typically in connection with calculating the SRES parameter on the basis of the RAND parameter and the secret key Ki by applying algorithm A8: Consequently, calculating the cipher key Kc is a part of the GSM authentication. The cipher key Kc is stored in the SIM application. According to the GSM standard, the Kc is 64 bits at most.

When the mobile switching centre MSC/VLR commands ciphering to be initiated, the cipher key Kc is transmitted from the visitor location register VLR to a base station. Furthermore, a command is transmitted to the mobile station, which starts using the Kc calculated at the SIM. The GSM network selects the ciphering algorithm on the basis of the identifier of the ciphering algorithm comprised in a "classmark" identifier transmitted by the mobile station. The base station and the mobile station carry out traffic ciphering and deciphering, depending on the direction of the traffic, by means of the cipher key Kc and the number of the traffic frame by applying algorithm A5. *The GSM System for Mobile Communications* by M. Mouly and M. Pautet, Palaiseau, France, 1992, ISBN: 2-9507190-0-7, for example, discloses a more detailed description of the GSM system.

Third generation mobile communication systems have been developed throughout the world. $3^{rd}$ generation partnership project 3GPP standardizes a third generation mobile communication system which is based on the GSM system and called a universal mobile telecommunications systems UMTS, which comprises a new radio interface, for example. The UMTS radio interface will be based on the wideband code division multiple access WCDMA technique. The GSM core network will be utilised in the UMTS system, whereby connection management and mobility management will mainly remain the same. The UMTS system will provide circuit-switched services and packet-switched services. The packet-switched services will probably be based on the general packet radio service GPRS in the GSM.

An essential requirement in the UMTS system is the handover requirement between the GSM and the UMTS. In connection with the present application, handover refers to changing a radio traffic connection and radio traffic responsibility from a source system to a target system without the data transfer connection provided for a user service being substantially disconnected. In the GSM/UMTS handover, the connection is thus handed over from the UMTS system to the GSM system, or vice versa. In the GSM/UMTS handover, the connection provided for the user remains similarly uninterrupted to one in the existing internal handover in the GSM system. This enables the UMTS system to be rapidly introduced since particularly in the beginning, the GSM system with its extensive coverage area can be used as backup. For this purpose, it is probable that devices called dual-mode mobile stations supporting both the GSM system and the UMTS system will appear on the market.

In the UMTS standardization work, it is likely that a solution with mainly similar principles to the GSM procedures will be selected as far as the security architecture is concerned. In such a case, as high compatibility with the GSM architecture as possible can be achieved. Both the UMTS network and a user service identity module USIM application of the SIM identity application kind in the GSM comprise a secret key which is required for carrying out authentication. Changes will primarily relate to key lengths and algorithms used; document TR S3.03 version 0.1.2 "3G Security: Security Architecture" in the 3GPP discusses security requirements in the UMTS system. Particularly the cipher key to be used will probably be longer than in the GSM system.

In order to support the GSM system, a UMTS IC card UICC comprising the USIM application may also comprise the SIM application of the GSM system. The UMTS system further requires that services may be provided to mobile stations with only a smart card comprising a GSM identity SIM application. Furthermore, at the early stage the GSM/UMTS core network may be the same, so the core network of the UMTS system can also support authentication and ciphering according to the GSM system as well.

In the GSM system, in a handover situation, ciphering parameters used in handover between mobile switching centres, such as the cipher key, are transmitted from the source network to the target network. Hence, when a connection is handed over from the GSM network to the UMTS network, the cipher key Kc according to the GSM can be used while the traffic remains ciphered all the time. It is naturally required that the UMTS network supports the ciphering according to the GSM system. It is also possible to carry out authentication according to the UMTS system and start using a UMTS cipher key after handover.

When the mobile station is in the UMTS network, a cipher key according to the UMTS system is available for its use. When handover from the UMTS system to the GSM system is carried out, the problem is the ciphering since a base station sub-system BSS according to the GSM system is not necessarily able to carry out the ciphering by the UMTS parameters. Consequently, the UMTS cipher key cannot be used as such after handover, according to the GSM principles. According to the prior art, when a change to the GSM system takes place, authentication according to the GSM system can be carried out after handover. In such a case, GSM ciphering can be initiated only after the cipher key Kc has been calculated. This, however, is time-consuming, and some of the traffic will be transferred over the GSM radio interface unciphered.

BRIEF DESCRIPTION OF THE INVENTION

An object of the invention is thus to provide a method and an apparatus implementing the method so as to enable the above-mentioned problems to be alleviated. The objects of the invention are achieved by a method and a system which are characterized by what is disclosed in the independent claims. Preferred embodiments of the invention are disclosed in the dependent claims.

The invention is based on the idea that a cipher key of a "second" mobile communication network according to a mobile communication system, such as a GSM system, is determined in a first mobile communication network typically according to a different mobile communication system, such as a UMTS system, when a mobile station operates in the first mobile communication network. In such a case, a "second" cipher key according to the second mobile communication network can be determined which can preferably be stored both in the mobile station and in the first mobile communication network usually using a "first" cipher key for ciphering traffic. The advantage achieved is that the second cipher key according to the second mobile communication network, such as the GSM network, is already available before a potential handover situation.

In a handover situation, the second cipher key can, according to a preferred embodiment of the invention, be transmitted from the first mobile communication network to a network element performing ciphering, such as a base station, in the second mobile communication network. Furthermore, the second cipher key stored in the subscriber identification application, such as the SIM application, is preferably transmitted to a means in the mobile station which carries out ciphering in the mobile station. Hence, as soon as the logical connection has been handed over to the base station system of the second mobile communication network, it is possible to start to use ciphering according to the network concerned both at the mobile station and at the network element in the second mobile communication network that carries out the ciphering. The advantage then achieved is that, with the exception of the first signalling messages, no traffic is transferred unciphered over the air interface after handover, as is the case in an internal handover situation in the GSM system.

According to a solution of the invention, a mobile communication network and a mobile station can use several different and alternative methods of ciphering or authentication by using different algorithms or keys. If the mobile communication network and the mobile station support more than one ciphering or authentication method, it is thus possible to e.g. change the cipher key used, if necessary.

According to a preferred embodiment of the invention, a first mobile communication network examines, by means of an IMSI and/or classmark identifier, for example, whether a mobile station supports a second mobile communication network. In such a case, the cipher key according to a second mobile communication network is preferably calculated only if the mobile station supports the second mobile communication network. Furthermore, according to a preferred embodiment of the invention, the second cipher key can be calculated simultaneously with authentication according to the first mobile communication system. In such a case, one message is preferably used for requesting of the authentication centre and further, the mobile station, calculation of a cipher key according to two different systems and, possibly, of an authentication response.

On the other hand, according to another preferred embodiment of the invention, a request can be specified for calculating explicitly a second cipher key according to the second mobile communication system. This can be necessary when, for example, it is detected that handover is necessary to a second mobile communication network. In such a case, calculation of the cipher key according to the second mobile communication network only can be requested preferably in connection with authentication. According to an embodiment of the invention, the second cipher key can be calculated only when necessary, in other words when a decision is made about handover to the second mobile communication network.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

Figure 2:
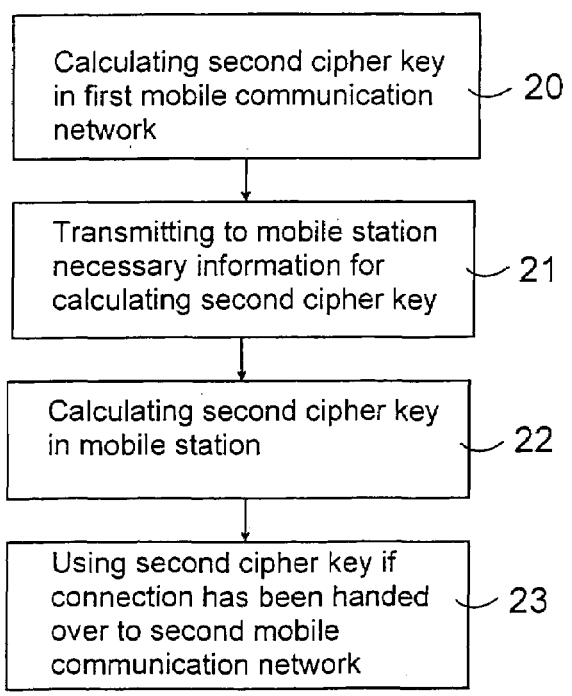
FIG. 2 shows a method according to a preferred embodiment of the invention in a simplified manner and by means of flow diagram.
Figure 3:
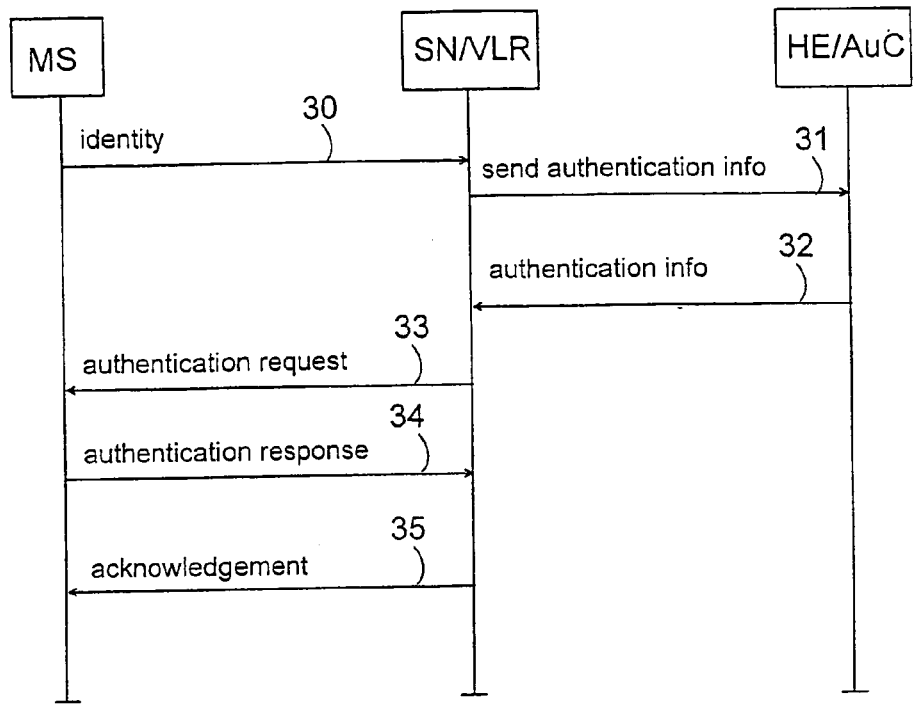
FIG. 3 shows an authentication implementation according to a preferred embodiment of the invention by means of a signalling diagram.
Figure 4:
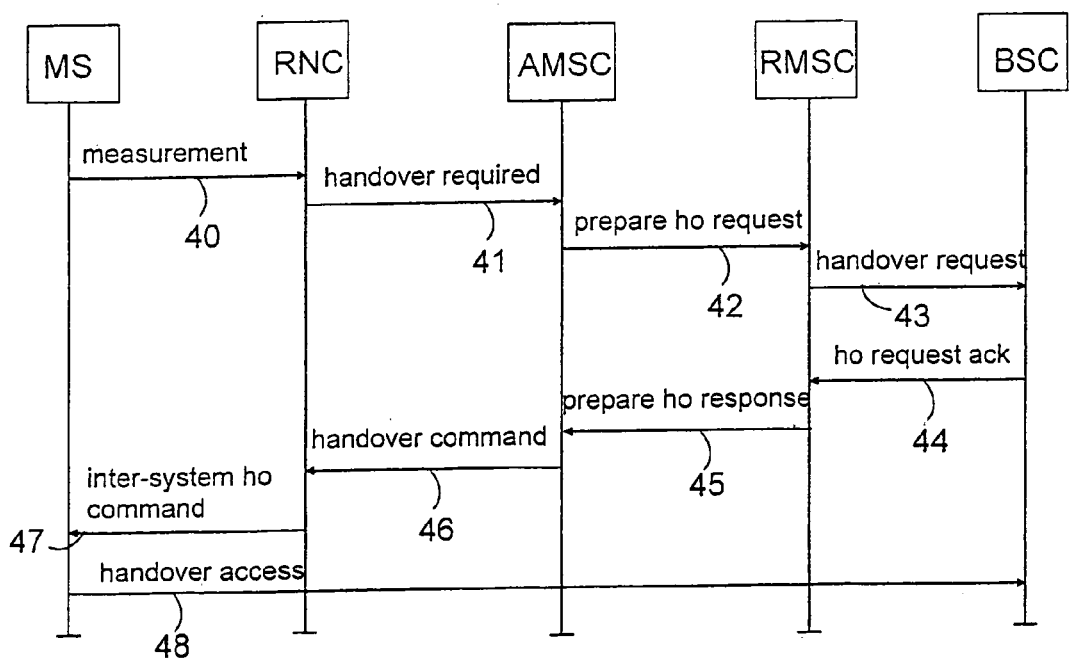
FIG. 4 shows, by way of example and by means of a signalling diagram, a handover function from a UMTS system to a GSM system.

In principle, the invention can be applied to any mobile communication system. It is particularly well suited for a UMTS system, which will largely be based on the GSM system. In the following, a preferred embodiment of the invention will be described by using an example wherein GSM authentication functions, calculation of a cipher key in particular, are carried out in a UMTS network before a handover function from the UMTS network to a GSM network (FIGS. 1 and 3) and a handover function which utilizes, according to the invention, a precalculated cipher key (FIG. 4). FIG. 2 describes in a simplified manner a method according to a preferred embodiment of the invention independently of the mobile communication system used.

Figure 1:
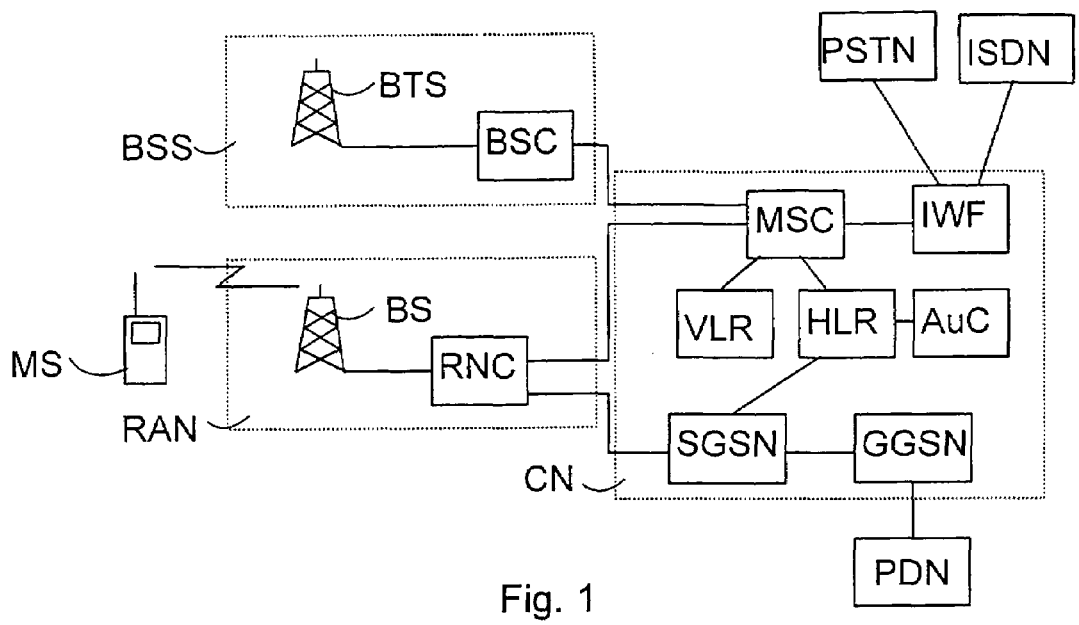
FIG. 1 shows, by way of example, a UMTS system with a GSM base station sub-system also connected thereto.

FIG. 1 shows, by way of example, a mobile communication network according to the UMTS system, a core network CN of the mobile communication network also being able to control a GSM base station sub-system. A UMTS mobile station MS comprises mobile equipment ME and a UICC smart card. A UMTS radio access network RAN comprises one or more base stations BS, and radio frequencies available to the base stations are controlled by a radio network controller RNC.

For circuit-switched services, the radio network controllers RNC are connected to a mobile switching centre MSC, which is responsible for connection establishment of the circuit-switched services and routing them to correct addresses. Two databases are utilized herein which comprise information on mobile subscribers: a home location register HLR and a visitor location register VLR. Similarly, a serving GPRS support node SGSN utilizing the home location register HLR is used for packet-switched services. Both the MSC and the SGSN communicate with an authentication centre AuC, typically via the home location register HLR.

The mobile switching centre MSC is via an interworking function IWF connected to other telecommunication networks, such as a public switched telephone network PSTN or an integrated services digital network ISDN. A GPRS gateway support node GGSN communicates with packet data networks PDN.

A base station sub-system BSS according to the GSM system is also connected to the core network CN, the base station sub-system BSS comprising at least one base transceiver station BTS and a base station controller BSC.

A home environment HE specified in the UMTS documents of the 3GPP enters a contract with a subscriber for service provision and provides a USIM application. In such a case, the home location register HLR is located in the home environment HE. A serving network SN refers to a network in the area of which the mobile station is currently located. In roaming situations or in situations in which service provision and network operation are separated from each other, separate home environment HE and serving network SN can be discerned. In FIG. 1, the home environment HE and the serving network SN are not separated.

In functions described later, the visitor location register VLR may be located in the serving network SN and the authentication centre AuC may be located in the home environment HE of a different operator or they may belong to a network controlled by the same operator. In connection with the present application, networks elements in the core network CN of FIG. 1 are named as in the GSM system; the essential feature is that the network elements are capable of carrying out the functions according to the UMTS system.

The security architecture in the UMTS system will be mainly similar to that in the GSM system. Hence, the procedure described earlier according to the GSM will also be implemented in the UMTS; probable differences will be discussed in the following. Table 1 shows UMTS parameters corresponding to GSM parameters that have been discussed in 3GPP document TR S3.03 version 0.1.2 "3G Security: Security Architecture".

TABLE 1

| DESCRIPTION | GSM | UMTS |
|---|---|---|
| random number parameter | RAND | RANDu |
| authentication checking parameter to be compared (authentication response) | SRES | XRES |
| cipher key | Kc | CK |
| integrity key | — | IK |
| authentication token | — | AUTN |

In authentication according to the UMTS system, the authentication centre AuC produces five parameters in accordance with Table 1 and transmits them to the visitor location register VLR. In the GSM system, three parameters are produced, i.e. a triplet. The random number parameter RANDu corresponds to the RAND parameter in the GSM system, but may vary in length. An authentication checking parameter XRES (Expected Response) and a cipher key CK in particular may also vary in length compared to the GSM parameters SRES and Kc. The GSM lacks an authentication token AUTN; it can be transmitted to the USIM application in the same message as the RANDu parameter. By means of the AUTN token, the USIM application can check whether the serving network has the right to serve UMTS services.

As distinct from the GSM system, the USIM generates an XRES parameter and calculates a cipher key CK only if the AUTN parameter is acceptable. As in the GSM system, the USIM transmits the calculated XRES parameter to the network to the visitor location register VLR, which compares it with the authentication checking parameter received from the authentication centre. The authentication has succeeded if the XRES calculated in the network and the XRES parameter calculated in the USIM application correspond to each other.

The GSM system lacks an integrity key IK; in the UMTS system, it will be used for protecting certain signalling messages, such as information on features of a mobile station, for example. The IK is calculated both in the USIM application and in the UMTS network. Since UMTS standardization work is still underway, algorithms necessary for producing the parameters shown in Table 1 have not been determined precisely. They will probably differ from GSM algorithms A3, A5 and A8. The key corresponding to the secret key Ki in the GSM is K in the UMTS, K being used in calculating authentication parameters both in the USIM application and the authentication centre.

In principle, the GSM or the UMTS network can request authentication of a mobile station at any time. Authentication can be carried out e.g. in connection with location update or while providing a paging response when a mobile station receives a call. The invention can be applied to authentication at any time.

In the example according to the invention, the mobile station MS is capable of establishing a connection both to the GSM and the UMTS networks, i.e. it is a so-called dual-mode mobile station. The MS thus comprises functions both according to the GSM system and the UMTS system, and further, functions of the SIM application and the USIM application. The SIM/USIM functions are preferably located on a smart card UICC and they can preferably be provided from the same operator, i.e. home environment HE, as one application. It is assumed that the subscriber identifier, preferably the IMSI, is the same both for the GSM and the UMTS system. Hence, the IMSI identifier identifies both the SIM application and the USIM application. On the basis of the IMSI identifier, the UMTS network can preferably also detect whether a subscriber that has the right to access both GSM and UMTS services is at issue. Even though the IMSI identifier were the same, authentication (comprising calculation of cipher keys) can be carried out in the solution according to a preferred embodiment of the invention for both the SIM application and the USIM application separately.

In the following, a method according to a preferred embodiment of the invention will be described in a simplified manner by means of FIG. 2, without being restricted to any certain mobile communication system. In FIG. 2, the most important steps of the invention are simplified, not all embodiments being shown. Later, by means of FIGS. 3 and 4, different steps and embodiments will be described in closer detail, applied to the UMTS and the GSM systems.

When a mobile station operates in a first mobile communication network, traffic being transferred over the air interface is ciphered mainly by using a first cipher key. According to the invention, a second cipher key according to a second mobile communication network is calculated in the first mobile communication network (20). This can take place after the first mobile communication network has detected a need for handover of the active connection to the second mobile communication network, for example, or in connection with authentication according to the first mobile communication network.

After calculating the second cipher key, the first mobile communication network transmits information necessary for calculating the cipher key to the mobile station (21). The mobile station detects that calculation of the second cipher key according to the second mobile communication network is at issue and carries out calculation of the second cipher key (22). Next, the second cipher key is available both in the first mobile communication network and at the mobile station. If the logical connection provided for the mobile station is handed over to the second mobile communication network, the second cipher key is used both at the mobile station and in the second mobile communication network after the handover (23). The first mobile communication network has then preferably transmitted the second key to the network element carrying out the ciphering in the second mobile communication network before handover. Hence, the traffic between the mobile station and the second mobile communication network can be ciphered immediately after handover.

In the following, a solution according to a preferred embodiment of the invention when applied to circuit-switched connections in the UMTS and GSM networks will be described in closer detail by means of FIG. 3. FIG. 3 shows an exemplary signalling pattern of an authentication process, i.e. production of a cipher key, production and checking of authentication parameters, only including steps that are essential to the invention. When the mobile station is within the area of the UMTS network, it is further assumed that the traffic between the mobile station and the mobile communication network is ciphered using the UMTS cipher key.

In FIG. 3, the mobile station MS transmits a location update request message, for example, in order to request location update (identity, arrow 30). The essential point is that the message (identity, arrow 30) comprises a UMTS subscriber identifier, either a TMSI or an IMSI identifier, for a similar purpose to the one in the GSM system, i.e. for identifying a subscriber. In some UMTS specifications, a temporary mobile user identity TMUI corresponds to the TMSI identifier, and an international mobile user identity IMUI to the IMSI identifier.

The UMTS network may also transmit a request to the mobile station to transmit a subscriber identifier, and the mobile station responds by transmitting the requested subscriber identifier (identity, arrow 30).

It is further possible that in the UMTS system, the IMSI identifier is ciphered over the radio path in order to prevent misuse. If the IMSI identifier is ciphered, the visitor location register VLR has to transmit the ciphered IMSI identifier to the home location register HLR, which transmits the unciphered IMSI identifier back to the visitor location register (not shown).

The visitor location register VLR transmits the request for authentication and the IMSI identifier to the home location register HLR and further to the authentication centre AuC (send authentication info, arrow 31). In the network, the VLR and the HLR communicate using the MAP signalling protocol. In the UMTS system, it is possible to use a different MAP version than in the GSM since, compared to the GSM, the above-described UMTS authentication functions require changes in the MAP protocol. Consequently, the home environment HE and further, the authentication centre AuC in connection with the home location register can infer from, for example, the MAP version that the request (send authentication info, arrow 31) has been received from a network capable of the UMTS.

On the basis of the IMSI identifier the home environment HE, preferably the home location register HLR, can detect that the subscriber has the right to access both the GSM and the UMTS network. According to a preferred embodiment of the invention, the authentication centre AuC calculates both the authentication parameters of the UMTS and the authentication parameters of the GSM (triplet) substantially simultaneously and transmits them to the visitor location register VLR. If the serving network SN is not according to the UMTS (an MAP version according to the GSM system, for example), or on the basis of the IMSI identifier only the SIM application can be used, the authentication centre AuC calculates preferably the GSM authentication parameters only. Furthermore, characteristics of the mobile station MS may also set requirements for the calculation of the GSM parameters, i.e. whether the mobile station supports the GSM system. Then, correspondingly, when the mobile station only supports the UMTS system or when, on the basis of the IMSI identifier, only the USIM application can be used, the AUC can calculate the authentication parameters of the UMTS only.

Alternatively, it is possible for the visitor location register VLR to request authentication information according to a desired system or systems in connection with a (send authentication info, arrow 31) message. This can be implemented, for example, by adding bits indicating the type of authentication requested to the authentication information request (send authentication info, arrow 31).

In order to avoid unnecessary processing power consumption, GSM authentication is carried out in the UMTS network only if the mobile station comprises the SIM application and the GSM functionality (dual-mode mobile station). The UMTS network can discern from the classmark identifier, for example, whether the mobile station supports the GSM system. In such a case, the visitor location register can, the classmark identifier and/or the IMSI identifier having indicated that the mobile station supports the GSM system, request authentication both according to the GSM system and the UMTS system of the authentication centre AuC in connection with the (send authentication info, arrow 31) message.

The authentication centre AuC transmits the calculated authentication information to the visitor location register VLR (authentication info, arrow 32), wherein the information is stored. Since the authentication centre has calculated the GSM authentication parameters, a cipher key Kc according to the GSM network is available in the serving network SN for later use. After this step, the idea of the invention can be applied at least in two different ways: by implicit or explicit GSM authentication, which will be described next.

An implicit GSM authentication according to a preferred embodiment of the invention will be discussed in the following. In this case, the UMTS random-number parameter RANDu received from the authentication centre AuC is equal in length to the GSM random-number parameter RAND (preferably 128 bits). The VLR transmits to the mobile station an authentication request (authentication request, arrow 33) comprising the random-number parameter RANDu of the length of the RAND parameter in the GSM system. Since the authentication at issue is authentication according to the UMTS system, an authentication token AUTN is also preferably transmitted to the USIM application of the mobile station.

According to a preferred embodiment of the invention, the mobile station MS transmits the random-number parameter RANDu both to the SIM and the USIM applications even though the authentication request authentication request, arrow 33) were according to the UMTS system. The mobile station may comprise, for example, means for checking the random-number parameter, in which case, when the random-number parameter is according to the GSM system, it is also transmitted to the SIM application. Then, according to a preferred embodiment of the invention, the SIM application calculates the cipher key Kc by using the secret key Ki and the RANDu parameter by applying A8 algorithm. The SIM application does not, however, have to produce the authentication checking parameter SRES. The SIM application stores the Kc for later use preferably in the memory of the smart card UICC.

The USIM application receives the RANDu parameter, and, if the authentication token AUTN is acceptable, carries out the calculation of the authentication checking parameter XRES. Then, by means of the secret key K and the RANDu parameter and the authentication algorithm of the UMTS, the USIM produces the XRES parameter. The cipher key CK of the UMTS can be calculated simultaneously by means of the secret key K and the calculation algorithm of the cipher key. The authentication checking parameter XRES is transmitted from the USIM application to the visitor location register VLR (authentication response, arrow 34), which compares it with the checking parameter received from the authentication centre AuC. If they match, authentication according to the UMTS has succeeded.

According to a preferred embodiment of the invention, in the implicit GSM authentication it is further assumed that the GSM authentication has been carried out when the UMTS authentication has succeeded. Furthermore, the cipher key according to the GSM system exists both in the UMTS network and in the USIM application for potential handover from the UMTS network to the GSM network. When authentication has been carried out, the UMTS network can transmit an approval, i.e. acknowledgement of the authentication to the mobile station MS (acknowledgement, arrow 35). Necessary procedures at a given time can then be continued according to the prior art; for example, the UMTS network may give the mobile station MS a command to initiate ciphering.

Since in the implicit GSM authentication it is only necessary to calculate the cipher key Kc, the authentication centre AuC does not necessarily have to calculate and transmit all authentication parameters of the visitor location register VLR. Only the cipher key Kc has to be calculated and transmitted to the visitor location register, preferably applying the same random-number parameter as in calculating the cipher key CK of the UMTS.

According to a preferred embodiment of the invention, so-called explicit GSM authentication can also be carried out. In such a case, the RANDu parameter can be of a different length than the RAND parameter of the GSM. The UMTS network then transmits, preferably in the authentication request (authentication request, arrow 33), information on which authentication is desired, the GSM authentication, the UMTS authentication, or possibly both.

The authentication request (authentication request, arrow 33) comprises, for example, a GSM bit and a UMTS bit. When the GSM bit has a value 1, the mobile station detects that it is the GSM authentication that is requested. Similarly, if the UMTS bit is 1, authentication according to the UMTS system will be carried out. If both bits are 1, authentication according to both systems can be carried out. The MS can detect the desired authentication also from the length of the random-number parameter RAND or RANDu. Furthermore, the mobile station MS can discern that it is the UMTS authentication that is desired if the authentication request (authentication request, arrow 33) comprises the authentication token AUTN.

If the serving network SN has requested GSM authentication, the RAND random-number parameter is transmitted to the SIM application and calculation according to the GSM system of the authentication response SRES and the cipher key Kc is carried out. The authentication response SRES is transmitted to the visitor location register VLR to be checked (authentication response, arrow 34) and the cipher key Kc is stored in the SIM application for potential later use.

If the serving network SN has requested UMTS authentication, the RANDu random-number parameter is transmitted to the USIM application and authentication according to the UMTS system is carried out in a manner described earlier. If the UMTS authentication succeeds, nothing, however, is assumed concerning the GSM authentication on the basis thereof, but the GSM authentication has to be carried out separately if the serving network SN so desires.

If the serving network SN requests authentication according both to the GSM and the UMTS systems, it preferably transmits both the RANDu and the RAND parameters in the authentication request (authentication request, arrow 33). When the mobile station has detected from, for example, the two different random-number parameters that both the UMTS authentication and the GSM authentication are requested, it transmits the RAND parameter to the SIM application and the RANDu parameter to the USIM application. The SIM and the USIM calculate the authentication responses SRES and XRES and the cipher keys Kc and CK. The mobile station MS transmits the SRES parameter transmitted by the SIM application and the XRES parameter transmitted by the USIM application to the visitor location register VLR (authentication response, arrow 34) possibly in different messages. The visitor location register VLR compares the authentication responses received from the mobile station MS with the ones received from the authentication centre AuC, and if they match, the authentications have succeeded.

The explicit method described above can generally be applied to a mobile communication system which supports several authentication methods. For example, it is possible that a new, alternative authentication and/or ciphering method will be developed for the UMTS system. The network element (e.g. the AuC) which carries out authentication and calculation of the cipher key and the means (e.g. the USIM) which carries out the corresponding functions in the mobile station comprise the same algorithms. If the serving mobile communication network and particularly the network element carrying out the functions of the visitor location register VLR know how to apply the parameters according to the alternative authentication method, the explicit method may be used. Hence, the serving mobile communication system can transmit to the authentication centre AuC an identifier of the authentication algorithm or algorithms used, for example.

On the other hand, it is also possible that the AuC is aware of the characteristics of the mobile station and further, the serving mobile communication network. In such a case, on the basis of the characteristics, it can also transmit the parameters according to the alternative method to the serving mobile communication network, to the visitor location register VLR, for example. Furthermore, the serving mobile communication network can preferably transmit to the mobile station information on the authentication method used in connection with the authentication request. This enables, for example, the cipher method used to be flexibly changed by calculating the cipher key according to the new authentication both at the authentication centre and the subscriber application. The cipher method used can, if necessary, be changed by transmitting the new cipher key to the means responsible for ciphering both in the mobile communication network and at the mobile station. Preferably, the authentication centre AuC is also informed that the cipher method has been changed successfully.

The great advantage achieved by the above-described GSM authentication according to the implicit or explicit method is that the cipher key Kc according to the GSM system is ready for potential handover from the UMTS system to the GSM system. The cipher key Kc is stored both in the UMTS network, preferably in the visitor location register VLR, and in the mobile station, preferably in the SIM application.

The calculation of the cipher key Kc according to the GSM system can be carried out if the serving network SN so desires. It can be carried out, for example, always in connection with the UMTS authentication.

The calculation of the cipher key Kc can, according to a preferred embodiment of the invention, also be carried out when it is detected from the local radio cells that a need exists to carry out handover to the base station sub-system BSS according to the GSM system. Furthermore, the cipher key Kc can be calculated while handover is being carried out, which, however, may cause delay in carrying out the handover.

The cipher key Kc according to the GSM system can also be determined by separating it from the cipher key CK of the UMTS when, for example, the connection is being handed over to the GSM base-station. The CK will probably be longer than the Kc. Then, the mobile station MS and the UMTS network, preferably the VLR, make the CK key as short as the Kc key and preferably store it in memory for later use. Hence, the Kc key according to the GSM system is available for a potential handover situation. It is then unnecessary to calculate the GSM parameters at the authentication centre or in the SIM application.

In the following, by means of FIG. 4, a handover process will be described in a circuit-switched connection by way of example, only taking into account parts relevant to the invention. The mobile station MS carries out measurements of base stations located in the neighboring area, measuring also base stations of the GSM system when the UMTS network has preferably so requested. The mobile station MS transmits the measurement information to a serving radio network controller RNC (measurement, arrow 40).

The RNC makes a decision about inter-system handover on the basis of, for example, whether a handover threshold has been exceeded as far as the signal strength is concerned. The RNC transmits an announcement about the necessity of the handover to an anchor mobile switching centre AMSC of the serving UMTS network SN (handover required, arrow 41). In handover, the AMSC is a so-called source mobile switching centre. The AMSC preferably comprises interworking function IWF, which enables a handover request according the GSM system to be produced. If the cipher key Kc is not yet precalculated, the AMSC can request that it be calculated after, for example, the AMSC has received the handover request (handover required, arrow 41). Before the handover request is transmitted to the GSM network, the cipher key Kc is calculated, for example, in the explicit manner described above.

The AMSC retrieves the precalculated cipher key Kc preferably from the visitor location register VLR. The AMSC transmits the cipher key Kc in the handover request to a relay mobile switching centre RMSC according to the GSM system together with other information according to the GSM system and necessary in the handover, such as the classmark information of the mobile station (prepare ho request, arrow 42). It is possible that the UMTS base station sub-system and the GSM base station sub-system to which handover is to be performed are connected to the same core network, as illustrated in FIG. 1. In such a case, both the GSM and the UMTS base station subsystems can be controlled by the same mobile switching centre MSC, which transmits the handover request to the GSM base station sub-system according to the GSM system.

The RMSC transmits the handover request, which also comprises the cipher key Kc, to a base station controller BSC (handover request, arrow 43). The BSC allocates the necessary resources according to the handover request and transmits the reply to the RMSC (ho request ack, arrow 44). The RMSC transmits the reply to the handover request to the AMSC (prepare ho response, arrow 45). The AMSC transmits a command according to the UMTS system to carry out the handover to the radio network controller RNC (handover command, arrow 46).

The RNC transmits to the mobile station MS the handover command between the UMTS and the GSM systems (intersystem ho command, arrow 47). This message comprises all necessary information on, for example, the radio channel for the mobile station to be able to carry out handover according to the GSM system. The mobile station MS recognizes that the handover is to the GSM system, and it activates the GSM functions. Furthermore, the mobile station preferably detects that a cipher key according to the GSM system is needed, whereby the cipher key Kc according to the GSM system is requested of the SIM application. The SIM application transmits the cipher key Kc to the means of the mobile station which carries out ciphering according to the GSM system.

The mobile station MS transmits a handover access message on a GSM channel allocated thereto as in a typical GSM system (handover access, arrow 48). The mobile station MS typically transmits one or more unciphered [HANDOVER ACCESS] messages determined in the GSM specifications. Next, the connection is handed over be served by the GSM base station subsystem according to the GSM system which is known per se and which needs not be described in closer detail here. Traffic to be transmitted can, according to a preferred embodiment of the invention, be ciphered by using the precalculated cipher key Kc and the ciphering algorithm A5 preferably immediately after the (handover access, arrow 48) message. The GSM network can possibly also carry out the authentication although the traffic can already be ciphered.

The great advantage achieved from the solution of a preferred embodiment of the invention is that the traffic between the mobile station and the mobile communication network can be ciphered immediately after handover by means of the cipher key Kc according to the GSM system. If no cipher key Kc for ciphering were available in the mobile station and the GSM base station, it would be necessary to carry out authentication and calculation of the cipher key after handover in the GSM network. In such a case, some of the traffic to be transmitted would remain unciphered and time would be wasted.

In order to implement a preferred embodiment of the invention compared to the prior art implementation, such as the GSM system, changes are mainly required in the functions of the mobile switching centre MSC/VLR, the visitor location register VLR and the mobile station MS. The functions required by the solution of the invention can be implemented by software.

The above-described authentication, calculation of the cipher key and handover implementation describe by way of example the application of the invention to the UMTS and the GSM systems. The invention can also readily be applied to other mobile communication systems, such as wireless local area networks.

It is obvious to one skilled in the art that as technology advances, the basic idea of the invention can be implemented in several different ways. The invention and its embodiments are thus not restricted to the above-described examples but they can vary within the scope of the claims.

The invention claimed is:

1. A method of arranging data protection in a telecommunication system including a first mobile communication network, a second mobile communication network, and a mobile station supporting both of the mobile communication networks, the method comprising:
   ciphering traffic between the mobile station and the first mobile communication network using a first cipher key;
   calculating a second cipher key to be used for ciphering traffic between the mobile station and the second mobile communication network in the first mobile communication network when the mobile station operates in the first mobile communication network;
   transmitting information necessary for calculating the second cipher key from the first mobile communication network to the mobile station when the mobile station operates in the first mobile communication network;
   calculating the second cipher key at the mobile station to be used for ciphering traffic between the mobile station and the second mobile communication network;
   transmitting the second cipher key from the first mobile communication network to the second mobile communication network;
   transmitting the second cipher key calculated at the mobile station to a ciphering module of the mobile station in response to a request from the first mobile communication network to handover to the second mobile communication network; and
   ciphering traffic between the mobile station and the second mobile communication network using the second cipher key after handover is complete.

2. The method of claim 1, further comprising:
   ciphering the traffic between the mobile station and the second mobile communication network using the second cipher key if the mobile station is handed over from the first mobile communication network to the second mobile communication network during an active connection.

3. The method of claim 1, further comprising:
   determining, in the first mobile communication network, whether the mobile station supports the second mobile communication network;
   calculating the second cipher key in the first mobile communication network in response to a determination that the mobile station supports the second mobile communication network;
   transmitting a request for calculation of the second cipher key from the first mobile communication network to the mobile station; and calculating the second cipher key at the mobile station in response to the request for calculation of the second cipher key.

4. The method of claim 3, wherein the second cipher key is calculated in the first mobile communication network when an identifier transmitted by the mobile station indicates that the mobile station supports the second mobile communication network.

5. The method of claim 1, further comprising:
calculating the second cipher key at a first element in the first mobile communication network in response to a request from a second element of the first mobile communication network, the second element including identifiers transmitted by the mobile station, and
transmitting the second cipher key from the first element to the second element.

6. The method of claim 1, wherein the mobile station includes a USIM application for the first mobile communication network and a subscriber identification SIM application for the second mobile communication network, the method further comprising:
transmitting information necessary to calculate the second cipher key received by the mobile station to the SIM application.

7. The method of claim 6, further comprising:
calculating the second cipher key in the first mobile communication network in connection with calculating an authentication response for the first mobile communication network and the first cipher key;
transmitting the information necessary for calculating the first cipher key and the second cipher key, such as a random-number parameter, from the first mobile communication network to the mobile station;
transmitting the necessary information for calculating the first and second cipher keys from the mobile station to the subscriber identification applications for the first and the second mobile communication networks;
calculating the second cipher key in the subscriber identification application for the second mobile communication network and calculating the authentication response in the subscriber identification application for the first mobile communication network;
transmitting the authentication response for the first mobile communication network from the mobile station to the first mobile communication network; and
acknowledging the authentication of the mobile station in the second mobile communication network in response to the first mobile communication network accepting the authentication response transmitted by the mobile station.

8. The method of claim 6, further comprising:
determining a random-number parameter and calculating an authentication response for the second mobile communication network in connection with calculating the second cipher key in the first mobile communication network;
transmitting a request for calculating an authentication response for the second mobile communication network to the mobile station;
transmitting the information necessary for calculating the second cipher key from the mobile station to the subscriber identification SIM application;
calculating the authentication response for the second mobile communication network in connection with calculating said second cipher key using the subscriber identification SIM application module;

transmitting the authentication response for the second mobile communication network that is calculated at the mobile station to the first mobile communication network; and
checking said authentication response according to the second mobile communication network transmitted by the mobile station in the first mobile communication network.

9. The method of claim 1, wherein the second cipher key is calculated by shortening the first cipher key in the first mobile communication network, and at the mobile station, before a handover to the second mobile communication network takes place.

10. The method of claim 1, wherein the second cipher key is calculated in response to a decision in the first mobile communication network to carry out a handover to the second mobile communication network.

11. A telecommunication system comprising:
a first mobile communication network configured to use a first cipher key for ciphering traffic between a mobile station and the first mobile communication network;
a second mobile communication network configured to use a second cipher key for ciphering traffic between a mobile station and the second mobile communication network; and
a mobile station configured to support said different first and second mobile communication networks,
wherein the first mobile communication network is configured to calculate the second cipher key when the mobile station operates in the first mobile communication network, and the first mobile communication network is configured to transmit information necessary for calculating the second cipher key from the first mobile communication network to the mobile station when the mobile station operates in the first mobile communication network, and the mobile station is configured to calculate said second cipher key,
wherein the first mobile communication network is configured to transmit the second cipher key to the second mobile communication network before a handover to the second mobile communication network,
wherein the mobile station is configured to transmit said second cipher key calculated at the mobile station to a ciphering module of the mobile station in response to the first mobile communication network transmitting a request to the mobile station for handover to the second mobile communication network, and
wherein the mobile station and the second mobile communication network are configured to cipher traffic after the handover using the second cipher key.

12. The telecommunication system of claim 11, wherein the mobile station and the second mobile communication network are configured to cipher traffic between the mobile station and the second mobile communication network using the second cipher key if the mobile station is handed over from the first mobile communication network to the second mobile communication network during an active connection.

13. The telecommunication system of claim 11, wherein the first mobile communication network is configured to determine whether the mobile station supports the second mobile communication network based on an identifier transmitted by the mobile station,
the first mobile communication network is configured to calculate the second cipher key in response to a determination that the mobile station supports the second mobile communication network, the first mobile communication network is configured to transmit a request to the mobile station for calculation of the second cipher key, and the mobile station is configured to calculate said second cipher key based on the request from the first mobile communication network.

14. The telecommunication system of claim 11, further comprising:

a first element of the first mobile communication network configured to receive the request for calculation of the second cipher key from a second element of the first mobile communication network configured to store identifiers transmitted by the mobile station of the first mobile communication network, wherein the first element is configured to calculate the second cipher key in response to the request from the second element, and the first element is configured to transmit the calculated second cipher key to the second element.

15. The telecommunication system of claim 11, wherein the first mobile communication network is configured to calculate the second cipher key in connection with calculation of an authentication response associated with the first mobile communication network and the first cipher key, the first mobile communication network is configured to transmit to the mobile station information necessary for calculating the first cipher key and the second cipher key, such as a random-number parameter, the mobile station includes a USIM identification application for the first mobile communication network and a SIM identification application for the second mobile communication network, the mobile station is configured to transmit the information necessary for calculating the first cipher key and the second cipher key to the identification applications for the first and the second mobile communication networks, the SIM identification application is configured to calculate the second cipher key, the USIM identification application is configured to calculate the authentication response for the first mobile communication network, and the mobile station is configured to transmit the authentication response for the first mobile communication network to the first mobile communication network.

16. The telecommunication system of claim 11, wherein the first mobile communication network is configured to determine a random-number parameter for the second mobile communication network and to calculate the authentication response in connection with calculating the second cipher key, the first mobile communication network is configured to transmit a request to the mobile station to calculate an authentication response for the second mobile communication network, the mobile station includes a USIM identification application for the first mobile communication network and a SIM identification application for the second mobile communication network, the mobile station is configured to transmit the information necessary to calculate the second cipher key to the SIM identification application for the second mobile communication network, the SIM identification application for the second mobile communication network is configured to calculate the second cipher key and the authentication response for the second mobile communication network substantially simultaneously, the mobile station is configured to transmit the authentication response for the second mobile communication network to the first mobile communication network, and the first mobile communication network is configured to check the authentication response for the second mobile communication network.

17. A network part in a first mobile communication network configured to use a first cipher key for ciphering traffic between the first mobile communication network and a mobile station, wherein the network part is configured to calculate, as the mobile station operates in the first mobile network, a second cipher key to be used for ciphering in a second mobile communication network, the network part is further configured to transmit information necessary for calculating the second cipher key from the first mobile communication network to the mobile station, the network part is configured to transmit the second cipher key to the second mobile communication network to be used for cipher traffic after the handover using the second cipher key, and the network part is configured to transmit a request to the mobile station for handover to the second mobile communication network.

18. A mobile station configured to support a first mobile communication network and a second mobile communication network, wherein the mobile station is configured to cipher traffic between the mobile station and the first mobile communication network using a first cipher key when the mobile station operates in the first mobile communication network, the mobile station is configured to receive from the first mobile communication network information necessary for calculating a second cipher key to be used for ciphering traffic between the mobile station and the second mobile communication network, the mobile station is configured to calculate the second cipher key, the mobile station is configured to transmit the second cipher key calculated at the mobile station to a ciphering module of the mobile station in response to the first mobile communication network transmitting a request to the mobile station for handover to the second mobile communication network, and the mobile station is configured to cipher traffic between the mobile station and the second mobile communication network using the second cipher key if the mobile station is handed over from the first mobile communication network to the second mobile communication network.

* * * * *